US006695581B2

(12) United States Patent
Wasson et al.

(10) Patent No.: US 6,695,581 B2
(45) Date of Patent: Feb. 24, 2004

(54) COMBINATION FAN-FLYWHEEL-PULLEY ASSEMBLY AND METHOD OF FORMING

(75) Inventors: Dewain L. Wasson, Hudson, WI (US); William B. Sinykin, Smithfield, UT (US)

(73) Assignee: McMillan Electric Company, Woodville, WI (US)

( * ) Notice: Subject to any disclaimer, the term of this patent is extended or adjusted under 35 U.S.C. 154(b) by 0 days.

(21) Appl. No.: 10/029,110

(22) Filed: Dec. 19, 2001

(65) Prior Publication Data

US 2003/0113209 A1 Jun. 19, 2003

(51) Int. Cl.[7] ............................................. F04D 29/00
(52) U.S. Cl. ........................... 416/60; 417/371; 474/93; 74/572; 310/62; 310/63; 310/74; 310/153
(58) Field of Search ................................ 416/60, 146 R; 417/371; 474/93; 74/572; 123/149 D, 41.49; 310/62, 63, 74, 153, 58, 263

(56) References Cited

U.S. PATENT DOCUMENTS

| 2,932,447 | A |   | 4/1960  | Phelon           |        |
|-----------|---|---|---------|------------------|--------|
| 3,838,301 | A |   | 9/1974  | Moriyama         |        |
| 3,906,266 | A |   | 9/1975  | Cowman           |        |
| 3,952,712 | A | * | 4/1976  | Hermanson        | 416/60 |
| 4,980,592 | A | * | 12/1990 | Olmr et al.      | 310/74 |
| 5,070,268 | A |   | 12/1991 | Phelon et al.    |        |
| 5,245,954 | A |   | 9/1993  | Donohue          |        |
| 5,476,430 | A |   | 12/1995 | Lee et al.       |        |
| 5,735,669 | A |   | 4/1998  | Niemela          |        |

FOREIGN PATENT DOCUMENTS

| AT | 215531    | A | * | 11/1960 | 310/62 |
| JP | 55-153898 | A | * | 12/1980 | 416/60 |
| JP | 59-81835  |   |   | 2/1984  |        |
| JP | 05-49215  |   |   | 2/1993  |        |
| JP | 06-086519 |   |   | 3/1994  |        |
| JP | 11-041890 |   |   | 2/1999  |        |

OTHER PUBLICATIONS

Exhibits A–C Photographs of a Flywheel Assembly.
Exhibits D–F Photographs of a Flywheel Assembly.
Exhibits G–H Photographs of a Flywheel Assembly.
Exhibits I–K Photographs of a Flywheel Assembly.
Exhibits L–N Additional Photographs of the Flywheel Assembly of Exhibits A–C, shown mounted to a motor.
Exhibits O–Q Additional Photographs of the Flywheel Assembly of Exhibits D–F, shown mounted to a motor.
Exhibits R–T Additional Photographs of the Flywheel Assembly of Exhibits G and H, shown mounted to a motor.
Exhibits U–W Additional Photographs of the Flywheel Assembly of Exhibits I–K, shown mounted to a motor.

* cited by examiner

Primary Examiner—Christopher Verdier
(74) Attorney, Agent, or Firm—Merchant & Gould P.C.

(57) ABSTRACT

A fan-flywheel-pulley assembly for use in conjunction with an electric motor. The assembly may include a pulley positioned about a central axis. The assembly may also include a flywheel coupled to the pulley and positioned about the central axis, the flywheel including an outer circumferential flywheel surface partially forming a plurality of circumferentially spaced openings. The flywheel may also include a baffle that extends circumferentially in close proximity to a cylindrical wall unit of the motor from an inner diameter to an outer diameter to limit a gap between the baffle and the cylindrical wall unit. Further, the assembly may also include a radial fan disposed within the flywheel including a plurality of blades extending at least from the flywheel inner diameter to the outer diameter each opening is positioned between each adjacent fan blade. The pulley, the flywheel, and the radial fan may be integrally formed.

19 Claims, 10 Drawing Sheets

COMBINATION FAN-FLYWHEEL-PULLEY ASSEMBLY AND METHOD OF FORMING

TECHNICAL FIELD

This invention relates generally to a flywheel assembly. More particularly, this invention relates to a combination fan-flywheel-pulley assembly with an integral baffle, used in conjunction with an electric motor.

BACKGROUND

Flywheel assemblies are typically coupled to an armature shaft of a motor to maintain rotational speed of the motor by virtue of the inertia of the flywheel. In addition, fans have been mounted to a motor to cool the motor. Pulley systems are also used to transfer power from the shaft of the motor to other components. Combination fan-flywheel-pulley assemblies typically include several components joined together, using a process such as staking, to create the fan, flywheel, and pulley assembly. Once such assembly is disclosed in U.S. Pat. No. 5,735,669 to Niemela.

Known fan-flywheel-pulley assemblies may have several shortcomings. The combination assemblies can be difficult to manufacture. In addition, the need for increased inertia from the flywheel requires an increase in the diameter of the flywheel, thereby increasing the size of any housing covering the assembly. Also, the performance of the fan can vary depending on the type of blade used to create the fan and depending on how efficiently the fan can circulate air through the motor.

Accordingly, there is a need for a combination fan-flywheel-pulley assembly that is simple to manufacture, maintains a low profile, and is efficient in cooling the motor.

SUMMARY

This invention relates generally to a flywheel assembly. More particularly, this invention relates to a combination fan-flywheel-pulley assembly with an integral baffle, used in conjunction with an electric motor.

According to a first aspect of the invention, a fan-flywheel-pulley assembly for use in conjunction with an electric motor is provided, the assembly generally comprising a pulley positioned about a central axis; a flywheel coupled to the pulley and positioned about the central axis, the flywheel including a baffle extending circumferentially over and in close proximity to a cylindrical wall unit of the motor, the baffle surrounding the motor to reduce air leakage between the baffle and the cylindrical wall unit; and a fan coupled to the flywheel including a plurality of radial blades and positioned about the central axis.

According to another aspect of the invention, a fan-flywheel-pulley assembly for use in conjunction with an electric motor may generally comprise a pulley positioned about a central axis; a flywheel coupled to the pulley and positioned about the central axis, the flywheel including an outer circumferential flywheel surface at least partially defining a plurality of circumferentially spaced openings, and wherein a portion of the flywheel extends circumferentially about a cylindrical wall unit of the motor from an inner diameter to an outer diameter, wherein the portion creates a baffle positioned in close proximity to the cylindrical wall unit to limit a gap between the baffle and the cylindrical wall unit; and a radial fan disposed within the flywheel and positioned about the central axis including a plurality of blades, wherein each of the plurality of blades extends at least from the inner diameter to the outer diameter of the flywheel so that one of the plurality of openings are positioned between each adjacent blade of the plurality of blades. The pulley, the flywheel, and the radial fan may be integrally formed.

According to yet another aspect of the invention, an electric motor is provided comprising a shaft rotatably mounted about a central axis and a housing enclosing the motor and including a cylindrical wall unit having a front plate connected to a front end of the cylindrical wall unit and a back plate connected to a back end of the cylindrical wall unit. Also included is an integral fan-flywheel-pulley assembly coupled to the shaft including a pulley including a circumferential pulley surface extending along the central axis; a flywheel coupled to the pulley and positioned about the central axis and extending circumferentially from an inner diameter to an outer diameter, the flywheel including an outer circumferential flywheel surface at least partially defining a plurality of circumferentially spaced openings and further including a baffle extending over and in close proximity to the cylindrical wall unit of the motor to reduce leakage of air between the baffle and the cylindrical wall unit and thereby improve air flow through the motor; and a radial fan disposed within the flywheel and positioned about the central axis including a plurality of blades, wherein each of the plurality of blades are curved and extend at least from the inner diameter to the outer diameter of the flywheel so that one of each of the plurality of circumferentially spaced openings are positioned between each adjacent blade of the plurality of blades, and wherein the radial fan draws air through the motor. The pulley, the flywheel, and the radial fan may be integrally formed.

BRIEF DESCRIPTION OF THE DRAWINGS

The patent in application file contains at least one drawing executed in color. Copies of this patent or patent application publication with color drawing(s) will be provided by the office upon request and payment of the necessary fee.

DETAILED DESCRIPTION

This invention relates generally to a flywheel assembly. More particularly, this invention relates to a combination fan-flywheel-pulley assembly with an integral baffle, used in conjunction with an electric motor. While the present invention is not so limited, an appreciation of the various aspects of the invention will be gained through a discussion of the examples provided below.

An example fan-flywheel-pulley assembly made in accordance with this invention generally includes a pulley positioned about a central axis, a flywheel assembly coupled to the pulley and positioned about the central axis, and a fan including a plurality of radial blades generally disposed within the flywheel. The flywheel assembly includes a baffle extending circumferentially over and in close proximity to a cylindrical wall unit of an electric motor.

Referring now to FIGS. 1–5, an exemplary fan-flywheel-pulley assembly 100 is shown in accordance with the present invention. The fan-flywheel-pulley assembly 100 generally comprises a fan 203, a flywheel 101, and a pulley 102. The fan 203, flywheel 101, and pulley 102 may be integrally coupled to form the assembly 100, as described in detail below.

Figure 1:
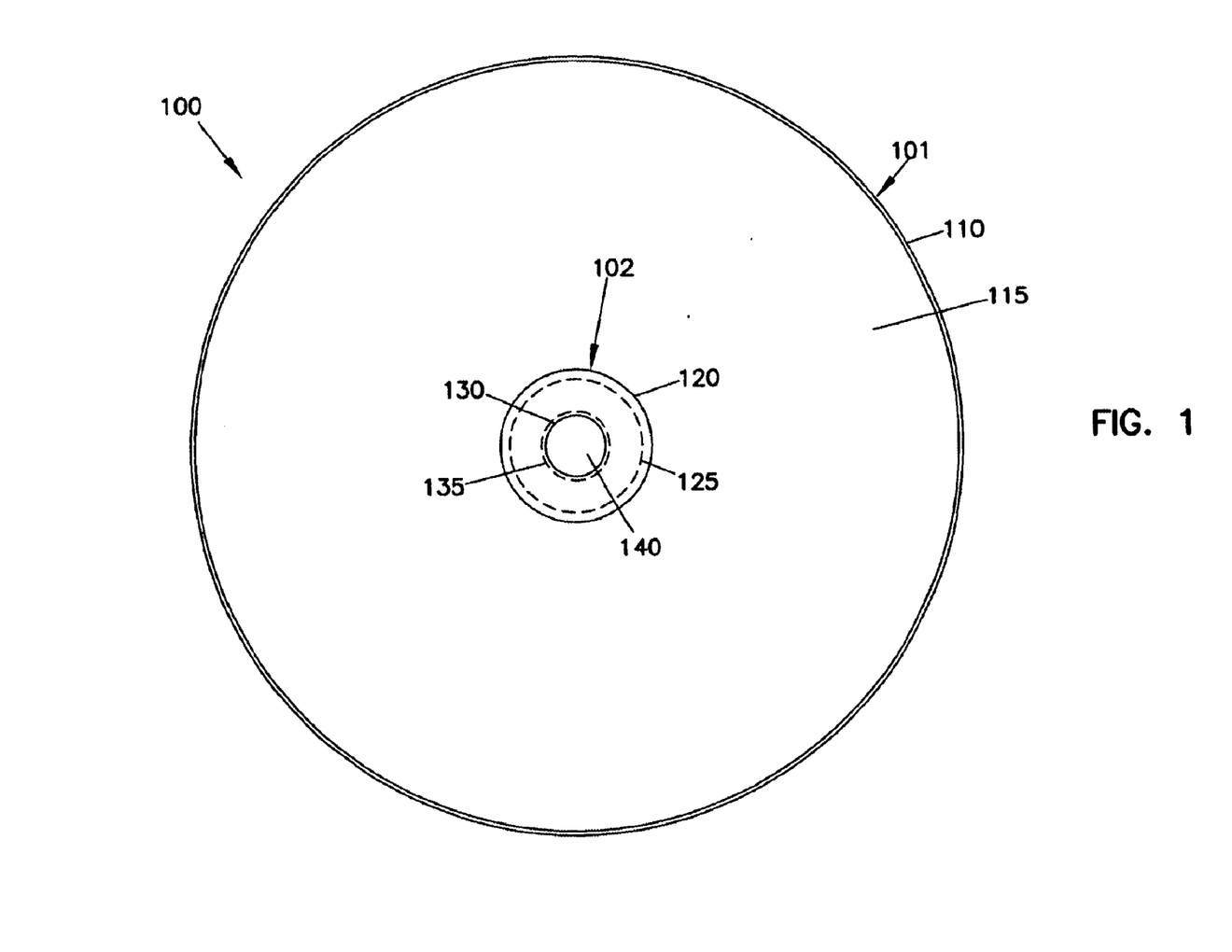
FIG. 1 is a front plan view of an exemplary combination fan-flywheel-pulley assembly in accordance with the present invention.
Figure 2:
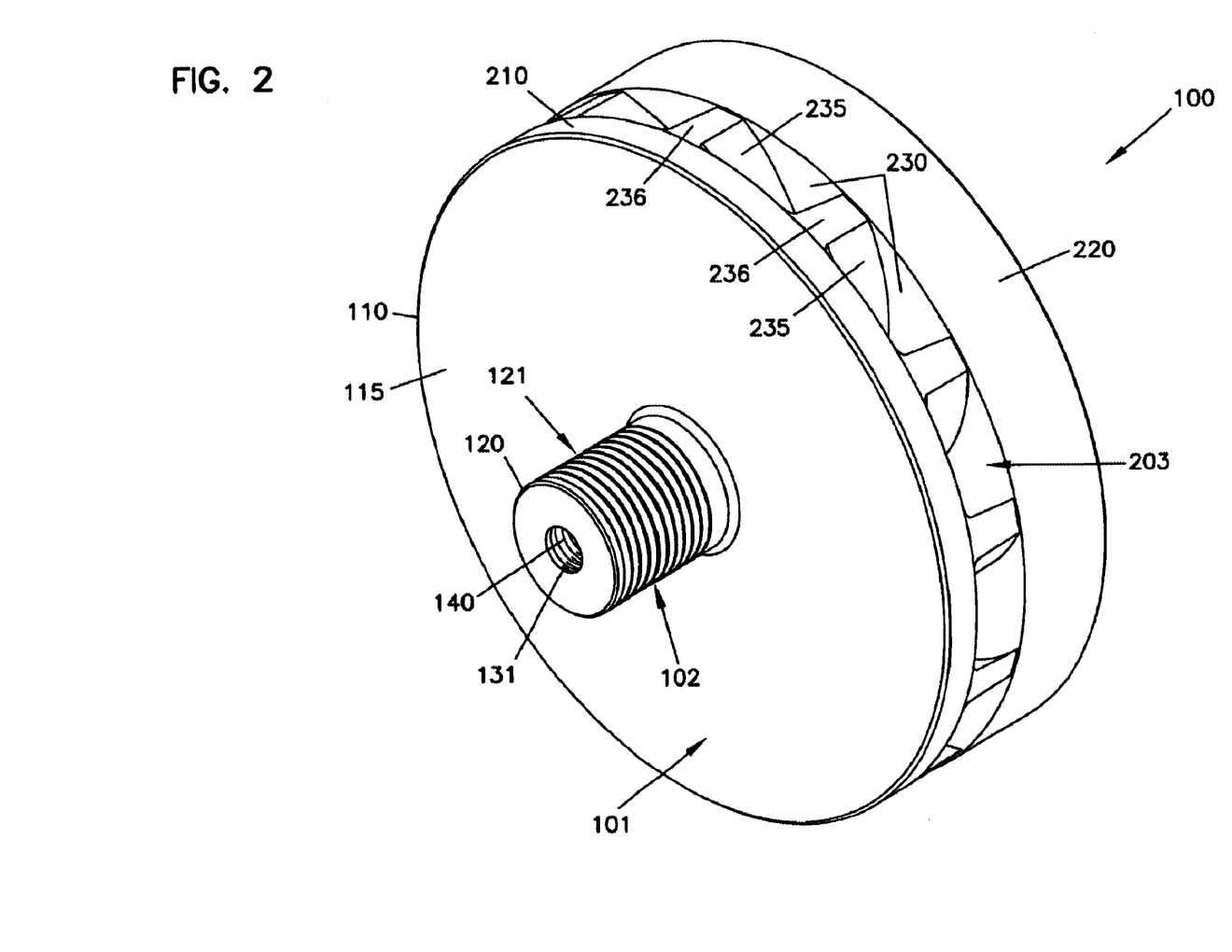
FIG. 2 is a front perspective view of the assembly of FIG. 1.

The pulley 102 of the assembly 100, shown best in FIG. 2, includes an outer pulley diameter 120 with an outer pulley surface 121 and an inner pulley diameter 130 with an inner pulley surface 131. The outer pulley surface 121 is grooved, with an inner groove diameter 125. The grooves on the outer surface 121 provide a surface with increased frictional grip to allow a belt, such as, for example, a standard or poly-v belt or a cog-belt, or other device to attach to the outer surface 121. Alternatively, the outer pulley surface 121 may not need to be grooved. The inner pulley diameter 130 defines an aperture 140. The inner pulley surface 131 is threaded, with a thread diameter 135. The threads on the inner pulley surface 131 allow the pulley 102 to be threaded onto an armature shaft of a motor (not shown) extending through the aperture 140. Alternatively, the inner pulley surface 131 may also be, for example, keyed, tapered, or configured to be press-fit onto a shaft of a motor.

Figure 4:
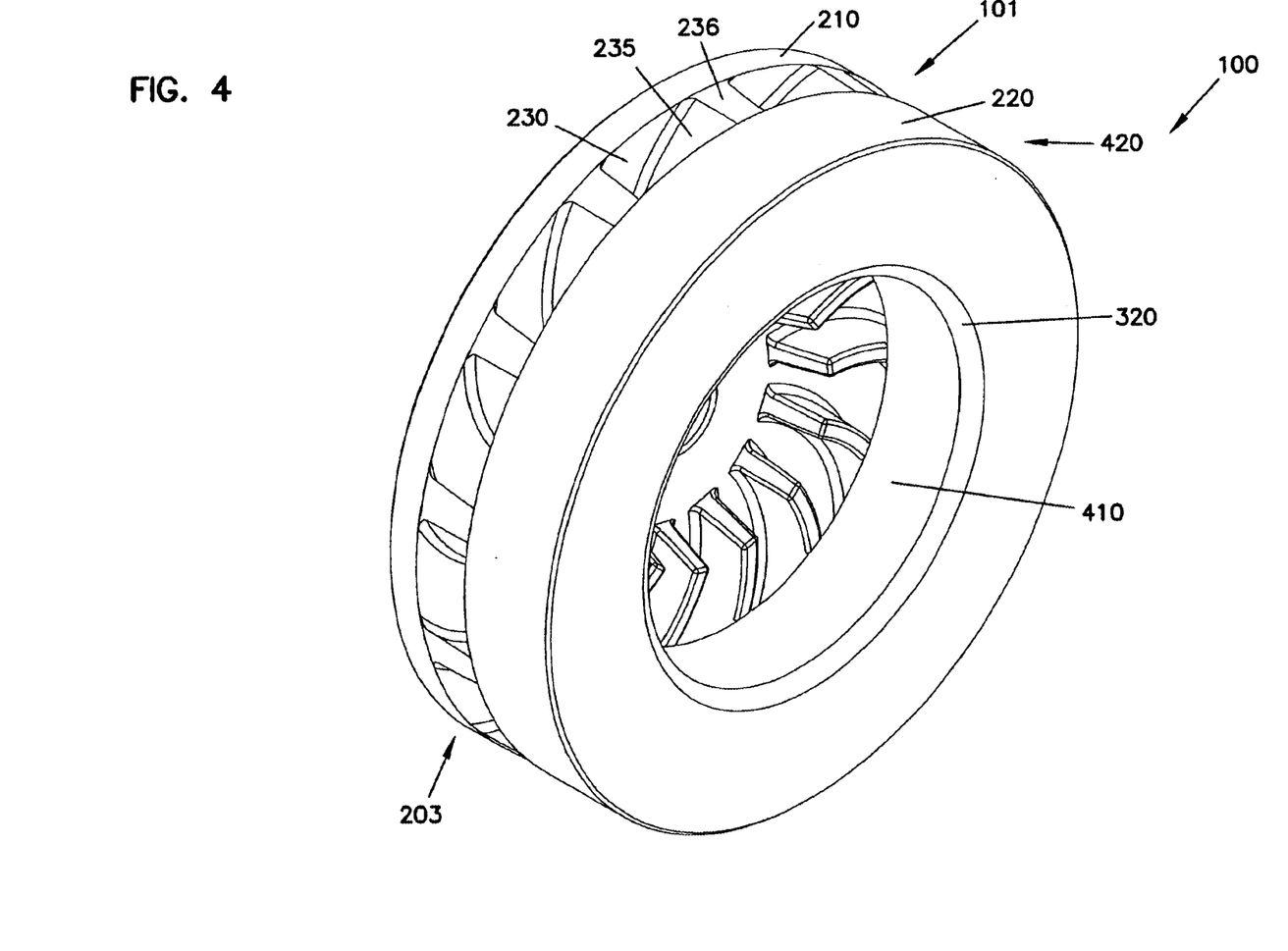
FIG. 4 is a back perspective view of the assembly of FIG. 1.
Figure 5:
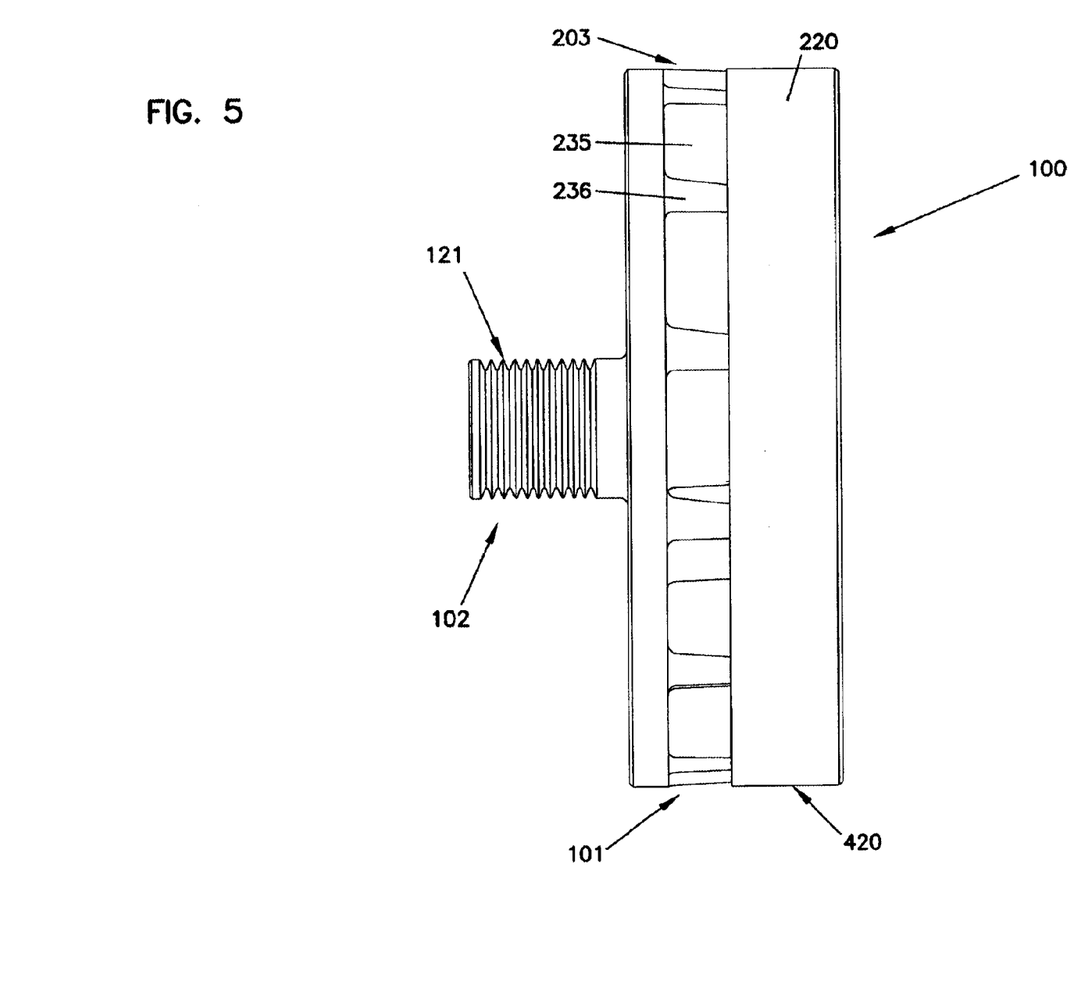
FIG. 5 is a side plan view of the assembly of FIG. 1.

The flywheel 101, shown best in FIGS. 2 and 4, is coupled to the pulley 102 and includes an outer flywheel diameter 110 and an inner flywheel diameter 310. The flywheel 101 generally defines an outer flywheel surface 210. In addition, the flywheel 101 includes a baffle portion 420 with an inner baffle diameter 320, an outer baffle surface 220, and an inner baffle surface 410. The outer flywheel surface 210 partially defines, along with a portion of the fan 203 described below, a plurality of openings 230 circumferentially spaced along the outer flywheel surface 210. A surface 115 of the flywheel 101 may preferably be, although need not be, solid and continuous.

Figure 3:
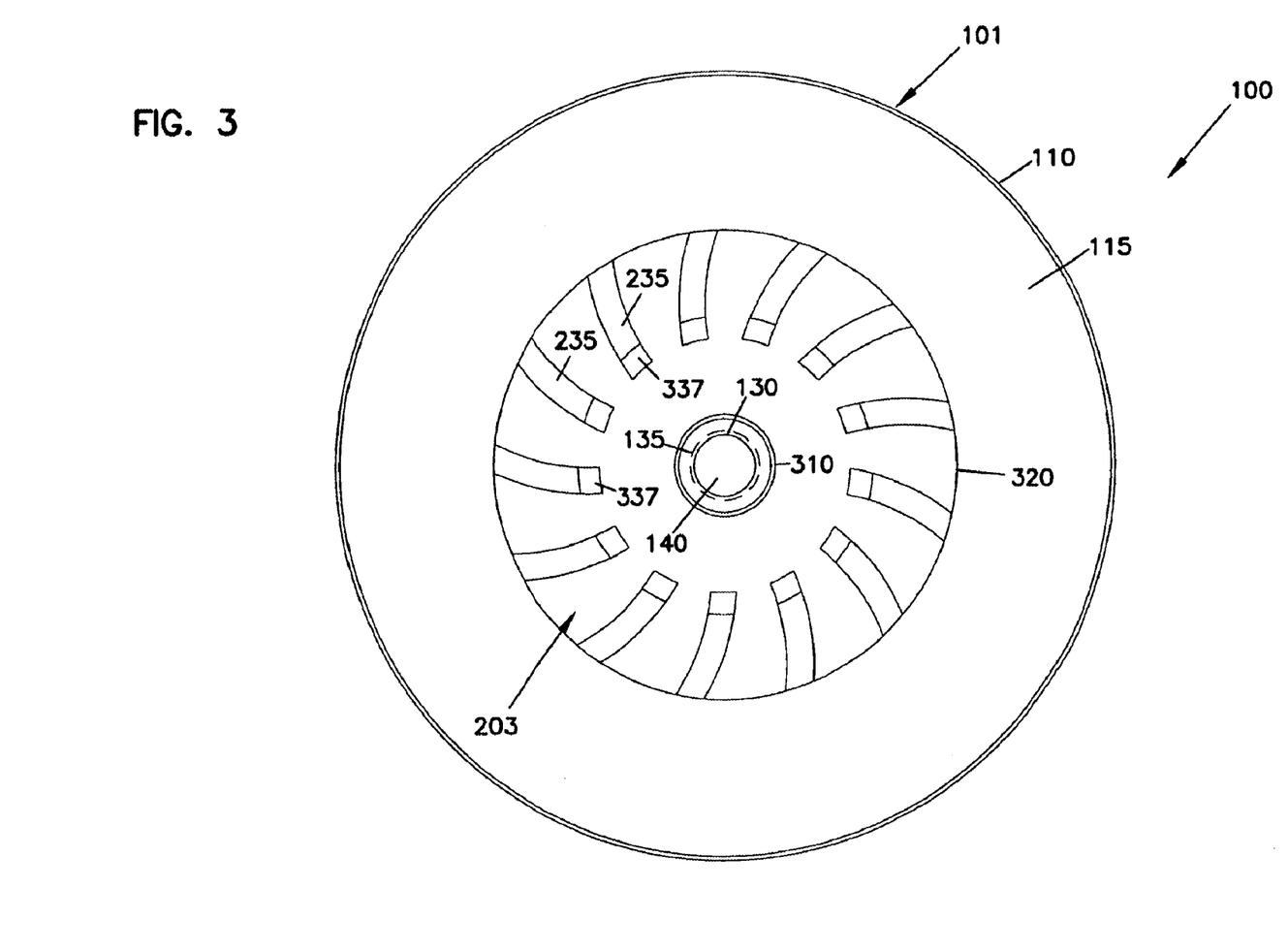
FIG. 3 is a back plan view of the assembly of FIG. 1.

The fan 203, shown best in FIGS. 3 and 4, is illustrated in the example assembly 100 as being generally disposed within the flywheel 101 and includes a plurality of blades 235. Outermost blade tips 236 of adjacent blades 235 are positioned on the outer flywheel diameter 210 to partially define each opening 230 along the outer flywheel diameter 210. An innermost tip 337 of each blade 235 may preferably, but need not, extend towards the aperture 140 past the inner baffle diameter 320. The blades 235 are also preferably curved, but may also be straight. The fan 203 is preferably a radial, or centrifugal fan, as opposed to an axial fan. A radial fan is preferable because the radial fan is best adapted to handle the high-pressure aerodynamic load of a motor.

Figure 6:
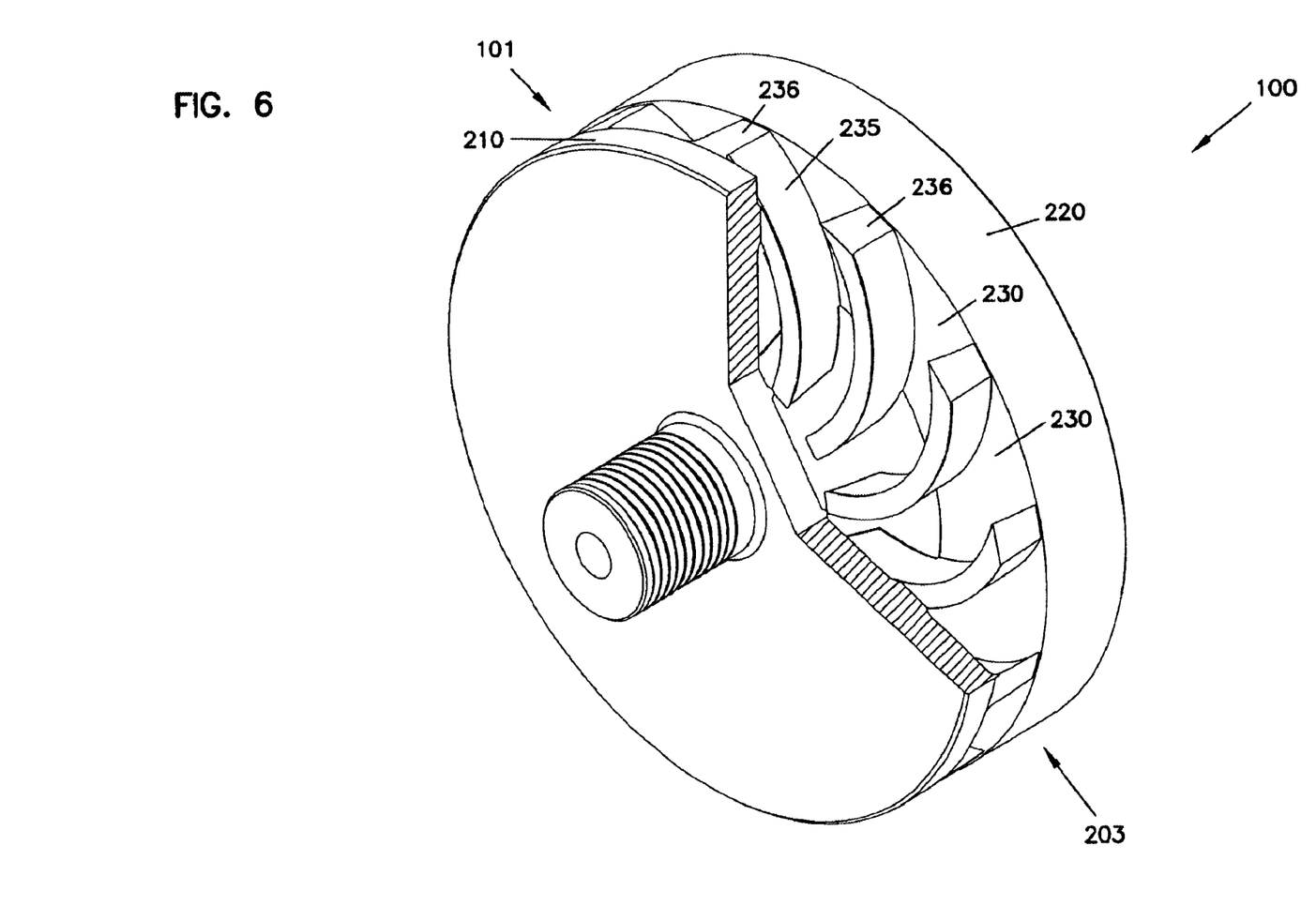
FIG. 6 is a cutaway front perspective view of the assembly of FIG. 1 showing the fan blades.

Referring now to FIG. 6, a cutaway front perspective view of the assembly 100 is provided with a portion of the flywheel 101 removed to better show the components of the fan 203. As shown, the outermost blade tip 236 of each blade 235 extends to the outer flywheel surface 210, thereby defining, along with a portion of the outer flywheel surface 210, each adjacent opening 230.

Figure 7:
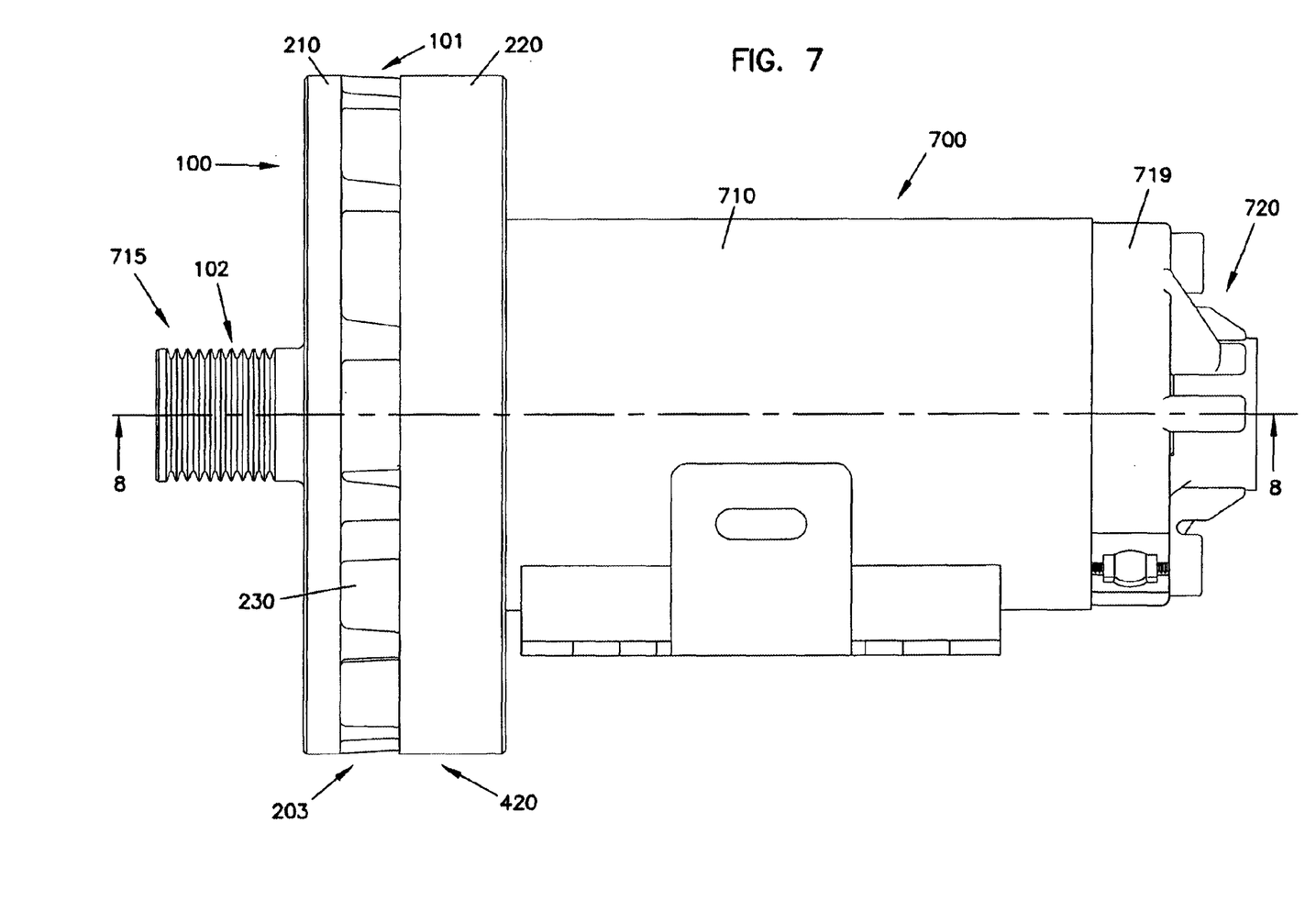
FIG. 7 is a side plan view of the assembly of FIG. 1 shown coupled to a motor in accordance with an example embodiment of the invention.
Figure 8:
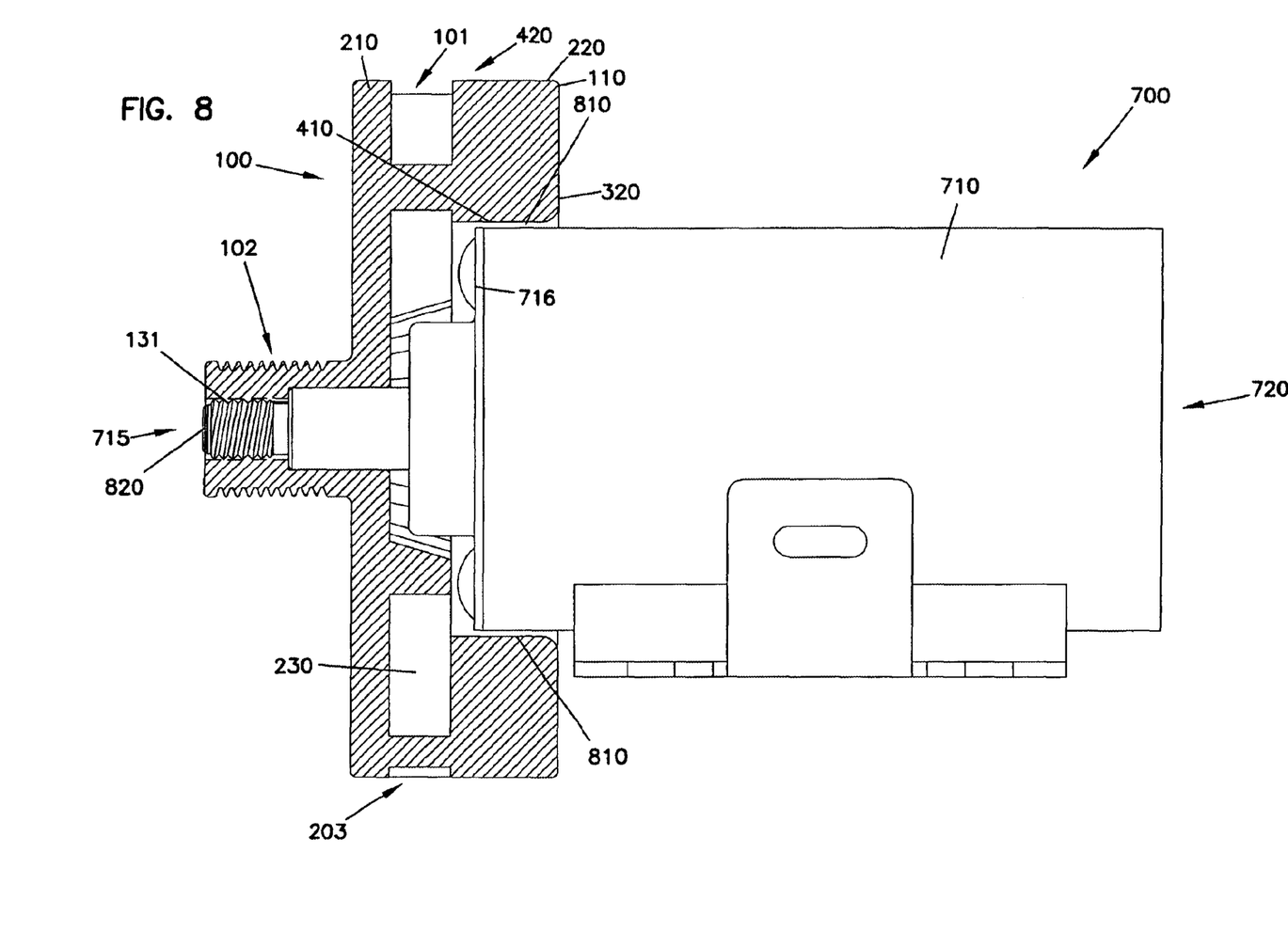
FIG. 8 is a cross-sectional view taken along line 7—7 of FIG. 7 showing the assembly and the motor.

In FIGS. 7 and 8, the assembly 100 is shown coupled to an example motor 700 in accordance with the present invention. The motor 700 includes a cylindrical wall unit or housing 710 as well as a front 715 and a rear 720. A front plate 716 may be connected to the front 715 of the motor 700, and a back plate 719 may be connected to the rear 720 of the motor 700. As illustrated, the assembly 100 is coupled to the motor 700 adjacent the front 715 of the motor 700. However, the assembly 100 may alternatively be coupled to the motor 700 adjacent the rear 720.

Referring now to the cross-sectional view in FIG. 8 taken along line 7—7 of FIG. 7, the threaded inner pulley surface 131 of the assembly 100 is threaded onto an armature shaft 820 of the motor 700. In this configuration, the assembly 100 rotates as the armature shaft 820 of the motor 700 rotates. The flywheel 101 of the assembly 100, through its inertia, stabilizes and maintains the rotational speed of the shaft 820. The pulley 102 of the assembly 100 can be connected to a belt or other component to transfer the rotational energy generated by the motor 700 to another component in the system. The fan 203 of the assembly 100 draws air from the rear 720 of the motor 700 through the housing 710. The air then exits through the openings 230. The air forced through the housing 710 functions to cool the internal components of the motor 700.

As shown in FIG. 8, the flywheel 101 of the assembly 100, specifically the baffle portion 420, extends over the housing 710 of the motor 700. The inner baffle diameter 320 is selected so that the inner baffle surface 410 extends in close proximity to the housing 710. The gap 810 between the inner baffle surface 410 and the housing 710 is generally small and is preferably equal to or less than ¼ inch, although other sizes are also possible. In this configuration, the inner baffle surface 410 is in close proximity to the housing 710 to reduce any leakage of air through gap 810. As the leakage is reduced, air is more efficiently forced from the rear 720, through the housing 710, along the blades 235, and out the openings 230 in the assembly 100, thereby cooling the motor 700 more efficiently.

The baffle portion 420 of the flywheel 101 extending over the motor 700 also provides additional inertia. To create a flywheel that generates additional inertia, it is necessary to add more mass to the flywheel. This can be accomplished by "building out" a flywheel by increasing the outer flywheel diameter 110, or, as disclosed in this invention, extending the flywheel so that it extends further over the motor. In some applications, it is preferable to minimize the profile, or outer diameter, of the flywheel. In these cases, inertia can be increased, in accordance with the present invention, by increasing the inner and outer baffle surfaces 220 and 410 to extend the assembly 100 further towards the rear 720 of the motor 700. In this manner, the assembly 100 is designed with a greater mass and therefore greater inertia, while still minimizing the profile, or outer diameter 110, of the assembly 100.

For example, for an application such as a treadmill, it is necessary to provide an assembly that has sufficient inertia to maintain a constant rotational speed but still maintain a low profile to fit into an aesthetically-pleasing treadmill housing. Therefore, the assembly 100 made in accordance with the present invention provides additional inertia via the baffle portion 420, while still maintaining a low profile to fit into a lower profile treadmill housing.

The exemplary assembly 100 may be made using a variety of methods, such as, for example, die casting, sand casting, plaster molding, metal injection molding, etc. The assembly 100 is preferably formed as a single, integral unit, although the assembly 100 can be formed of various pieces joined together to create an integral unit. As used herein, "integrally formed" means formed as a single unit out of a unitary piece of material, such as by molding.

An example method of making the assembly 100 may generally include: (1) providing a mold made of known materials such as sand or plaster; (2) introducing a molten material into the mold; (3) allowing the molten material to harden a predetermined amount of time to form the molded unit; (4) stripping the molded unit from the mold; and (5) performing various finishing processes such as cleaning, trimming, machining, and/or balancing the molded unit. Other methods of forming the assembly 100 can also be used without departing from the scope of the invention.

The exemplary assembly 100 may be made of a variety of materials. Generally, the assembly 100 may be made of any castable metal, such as, for example, iron, aluminum, zinc, magnesium, etc. Other materials may also be used depending on the desired use for the assembly 100.

Figure 9:
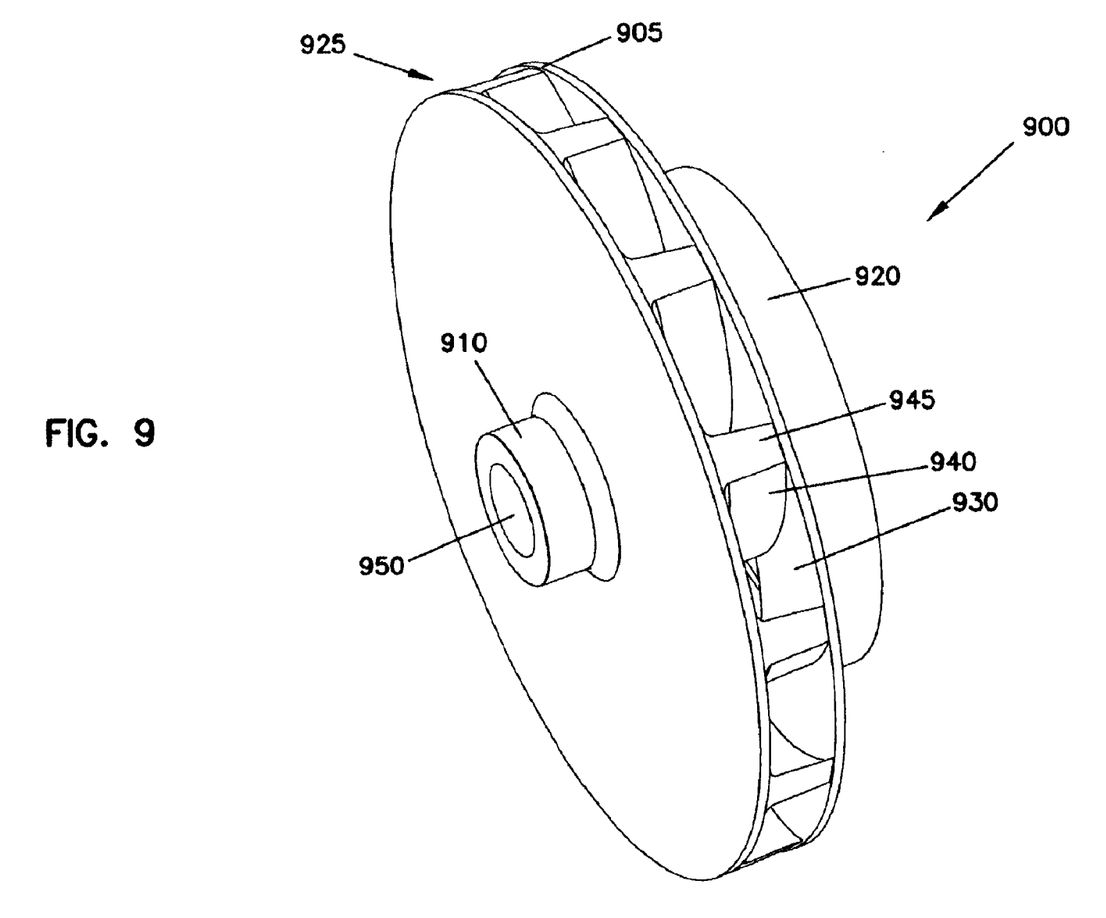
FIG. 9 is a front perspective of a second embodiment of an exemplary fan assembly in accordance with the present invention.
Figure 10:
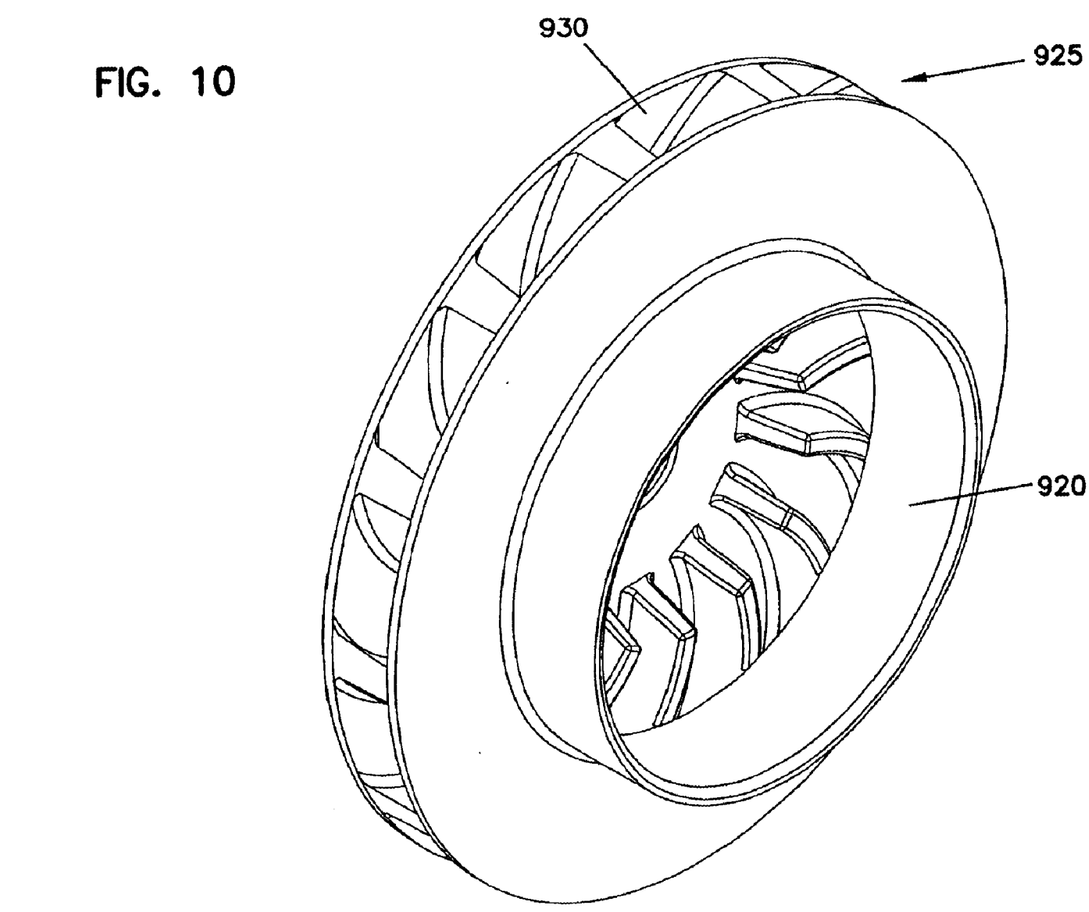
FIG. 10 is a back perspective of the fan assembly shown in FIG. 9.

A second embodiment of an exemplary assembly 900 made in accordance with the present invention is shown in FIGS. 9 and 10. The assembly 900 is similar to the assembly 100. However, the assembly 900 is designed to function more as a light, highly-efficient fan.

The assembly 900 includes a hub 910. The hub 910 may or may not function as the pulley system described in reference to the assembly 100. Alternatively, the hub 910 may be removed from the assembly 900 if not needed.

A plurality of blades 940 form a fan 925 disposed within the assembly 900. A blade tip 945 of each of the plurality of blades 940 extends to an outer diameter 905 of the assembly 900, and adjacent tips 945 define a plurality of openings 930 circumferentially spaced along the assembly 900 outer diameter 905.

The assembly 900 includes a baffle portion 920. The baffle portion 920 is constructed to extend in close proximity to a housing of a motor (not shown) onto which the assembly 900 is mounted. In this configuration, as explained above, the baffle portion 920 may reduce leakage of air between the baffle portion 920 and the housing of the motor, thereby increasing the efficiency of the fan. The assembly 900 may therefore be advantageous in applications that require little or no additional inertia but would benefit from the high efficiency of the fan 925.

The assembly 900 may be made using a variety of processes, for example, injection or compression molding. If injection molding is used, the steps for forming the assembly 900 may generally include: (1) providing a mold with a cavity; (2) injecting the cavity with a polymer under pressure; (3) allowing the polymer to solidify; (4) unclamping the mold; (5) removing the molded unit; and (6) performing various finishing processes such as trimming flash. Other processes may also be used.

The assembly 900 may be made using a variety of materials. Preferably, the assembly 900 is made of a light material, such as a polymer, although other materials, such as lighter castable metals (e.g., aluminum), may also be used.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fan-flywheel-pulley assembly for use in conjunction with an electric motor, the assembly comprising:
    a pulley positioned about a central axis;
    a flywheel coupled to the pulley and positioned about the central axis, the flywheel including a baffle with an inner baffle diameter extending circumferentially over and in close proximity to a cylindrical wall unit of the motor, the baffle surrounding the motor to reduce air leakage between the baffle and the cylindrical wall unit; and
    a radical flow fan coupled to the flywheel including a plurality of radial blades and positioned about the central axis.

2. The fan-flywheel-pulley assembly of claim 1, wherein the flywheel extends circumferentially from an inner diameter to an outer diameter, the flywheel including an outer circumferential flywheel surface at least partially defining a plurality of circumferentially spaced openings.

3. The fan-flywheel-pulley assembly of claim 2 wherein the fan is disposed within the flywheel and wherein each of the plurality of radial blades extends at least from the inner baffle diameter to the outer diameter of the flywheel so that one of each of the plurality of openings are positioned between each adjacent blade of the plurality of blades.

4. The fan-flywheel-pulley assembly of claim 3, wherein each of the plurality of radial blades extends past the inner baffle diameter towards the central axis.

5. The fan-flywheel-pulley assembly of claim 1, wherein a gap between the baffle and the cylindrical wall unit is less than ¼ inch.

6. The fan-flywheel-pulley assembly of claim 1, wherein each of the plurality of radial blades is curved.

7. The fan-flywheel-pulley assembly of claim 1, wherein the baffle rotates with the assembly.

8. The fan-flywheel-pulley assembly of claim 1, wherein the pulley, the fan, and the flywheel are integrally formed.

9. The fan-flywheel-pulley assembly of claim 8, wherein the assembly is molded.

10. The fan-flywheel-pulley assembly of claim 1, wherein the baffle extends over the cylindrical wall unit of the motor to increase an amount of inertia generated by the assembly.

11. A fan-flywheel-pulley assembly for use in conjunction with an electric motor, the assembly comprising:
    a pulley positioned about a central axis;
    a flywheel coupled to the pulley and positioned about the central axis, the flywheel including an outer circumferential flywheel surface at least partially defining a plurality of circumferentially spaced openings, and wherein a portion of the flywheel extends circumferentially about a cylindrical wall unit of the motor from an inner diameter to an outer diameter, wherein the portion creates a baffle positioned in close proximity to the cylindrical wall unit to limit a gap between the baffle and the cylindrical wall unit; and
    a radial fan disposed within the flywheel and positioned about the central axis including a plurality of blades, wherein each of the plurality of blades extends at least from the inner diameter to the outer diameter of the flywheel so that one of the plurality of openings are positioned between each adjacent blade of the plurality of blades;
    wherein the pulley, the flywheel, and the radial fan are integrally formed.

12. The fan-flywheel-pulley assembly of claim 11, wherein the assembly is molded.

13. The fan-flywheel-pulley assembly of claim 11, wherein the baffle extends over the cylindrical wall unit of the motor to increase an amount of inertia generated by the assembly.

14. The fan-flywheel-pulley assembly of claim 11, wherein the gap between the baffle and the cylindrical wall unit is less than ¼ inch.

15. The fan-flywheel-pulley assembly of claim 11, wherein the baffle rotates with the assembly.

16. An electric motor comprising:
   a shaft rotatably mounted about a central axis;
   a housing enclosing the motor and including a cylindrical wall unit having a front plate connected to a front end of the cylindrical wall unit and a back plate connected to a back end of the cylindrical wall unit; and
   an integral fan-flywheel-pulley assembly coupled to the shaft including:
      a pulley including a circumferential pulley surface extending along the central axis;
      a flywheel coupled to the pulley and positioned about the central axis and extending circumferentially from an inner diameter to an outer diameter, the flywheel including an outer circumferential flywheel surface at least partially defining a plurality of circumferentially spaced openings and further including a baffle extending over and in close proximity to the cylindrical wall unit of the motor to reduce leakage of air between the baffle and the cylindrical wall unit and thereby improve air flow through the motor; and
      a radial fan disposed within the flywheel and positioned about the central axis including a plurality of blades, wherein each of the plurality of blades are curved and extend at least from the inner diameter to the outer diameter of the flywheel so that one of each of the plurality of circumferentially spaced openings are positioned between each adjacent blade of the plurality of blades, and wherein the radial fan draws air through the motor;
   wherein the pulley, the flywheel, and the radial fan are integrally formed.

17. The electric motor of claim 16, wherein the baffle extends over the cylindrical wall unit of the motor to increase an amount of inertia generated by the assembly.

18. The electric motor of claim 16, wherein a gap between the baffle and the cylindrical wall unit is less than ¼ inch.

19. The electric motor of claim 16, wherein the baffle rotates with the assembly.

\* \* \* \* \*

UNITED STATES PATENT AND TRADEMARK OFFICE
CERTIFICATE OF CORRECTION

PATENT NO.    : 6,695,581 B2
DATED         : February 24, 2004
INVENTOR(S)   : Wasson et al.

It is certified that error appears in the above-identified patent and that said Letters Patent is hereby corrected as shown below:

Column 6,
Line 12, "a radical flow fan" should read -- a radial flow fan --.

Signed and Sealed this

Twenty-ninth Day of November, 2005

JON W. DUDAS
*Director of the United States Patent and Trademark Office*